Nov. 29, 1938.  E. L. BARE  2,138,084
MOTOR VEHICLE
Filed July 26, 1934
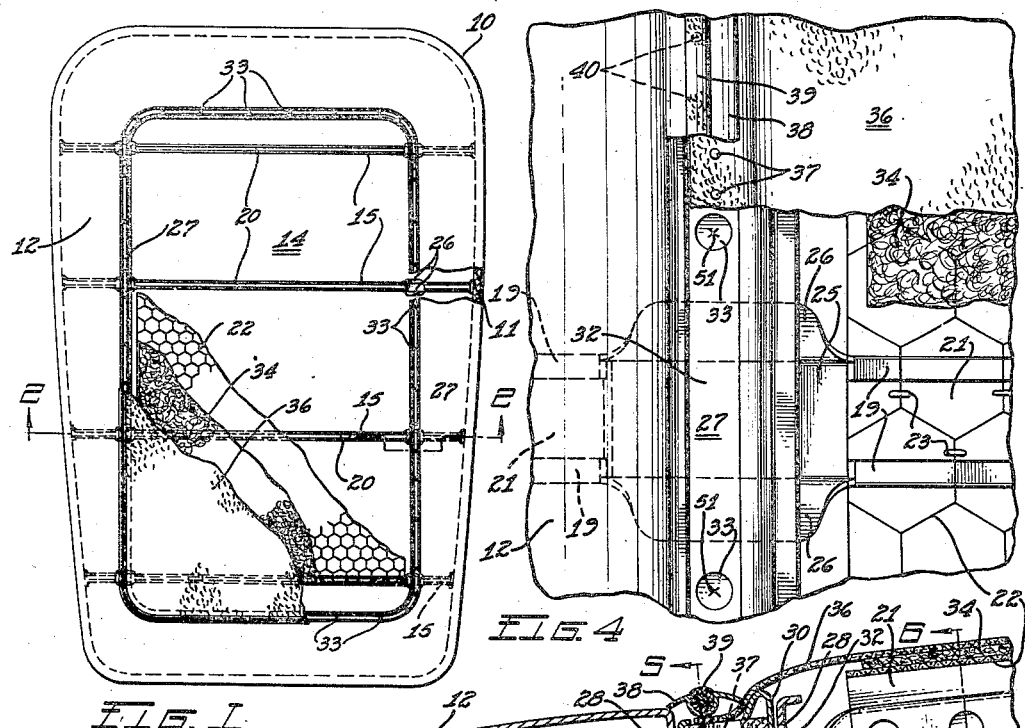
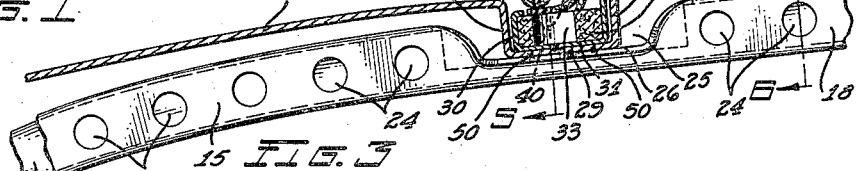
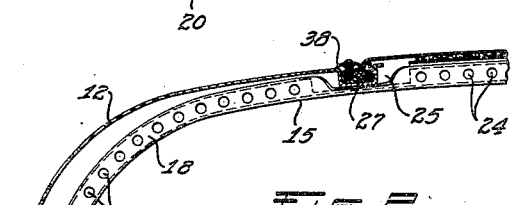
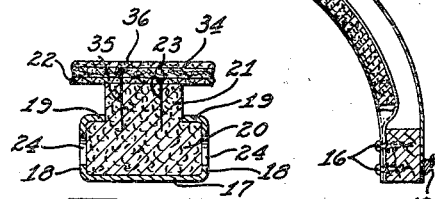
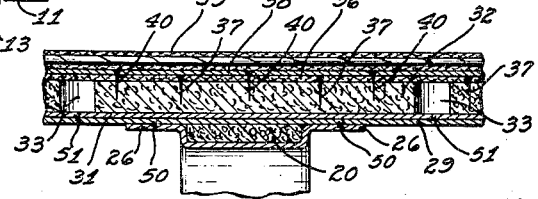
Inventor
ERWIN L. BARE.

Patented Nov. 29, 1938

2,138,084

UNITED STATES PATENT OFFICE 2,138,084

MOTOR VEHICLE

Erwin L. Bare, Detroit, Mich., assignor to Packard Motor Car Company, Detroit, Mich., a corporation of Michigan Application July 26, 1934, Serial No. 737,029

2 Claims. (Cl. 296—137)

This invention relates to motor vehicles and more particularly to motor vehicle body frame structure.

An object of the invention is to reduce the manufacturing cost of motor vehicle bodies by a method of applying tacking stripping.

Another object of the invention is to provide a method of permanently attaching tacking stripping to a metal body whereby the stripping can first be entirely fabricated separately from the body.

Other objects of the invention will appear from the following description taken in connection with the drawing, which forms a part of this specification, and in which:

Fig. 1 is a top plan view of a motor vehicle body, partly broken away, incorporating my invention;

Fig. 2 is a sectional view of the same, taken substantially on line 2—2 of Fig. 1, through one of the bows;

Fig. 3 is an enlarged fragment of the view shown in Fig. 2;

Fig. 4 is a fragmentary enlarged plan view of the roof structure with the decking, wadding and finishing moulding partly broken away;

Fig. 5 is a sectional view taken on line 5—5 of Fig. 3;

Fig. 6 is a sectional view taken on line 6—6 of Fig. 3;

Referring now to the drawing by characters of reference, 10 indicates generally the top portion of a motor vehicle body having the conventional top rail structure 11 extending therearound. Roof paneling 12 is secured to the rail 11 and is enclosed along its side edges by conventional drain gaskets 13. The roof paneling is formed so that it defines a substantially rectangular space 14 in the top of the roof structure.

One or more bows, as indicated generally at 15, extend transversely between the side sections of the roof rail. Each bow is formed of a single length of metal bent into channel form when viewed in section, as shown in Fig. 6. These bows span the space between the side portions of the top rail and are flattened at their ends and secured to the inner face of the rail by screws 16. The bottom or base of the bows is indicated at 17, the sides at 18 and the inturned top portions at 19. A filler strip 20, preferably formed of compressed paper, is carried by each bow and the central length thereof, transversely of the body, is formed with a neck 21 extending some distance above the top flanges 19 to form a support for a radio antenna 22, preferably in the form of chicken wire. The wire is secured to the top of the neck portions 21 of the filler by tacking means 23. The bow sides 18 are formed with a plurality of openings 24 through which tacks can be driven into the filler strip to secure supporting means for the head lining (not shown). This form of filler provides an insulated support for the antenna which spaces it sufficient distance from the metal frame so that interference is eliminated.

These continuous one piece metal bows are formed preferably of sheet metal or a light stamping and serve to maintain the side portions of the roof rail in rigid relation. Such metal bows are of considerably less weight and stronger than the composite metal and wood bow structure which has been used heretofore.

The side walls of each bow are bent outwardly and downwardly to form depressions 25 and flange seats 26 for receiving and mounting tacking stripping, as indicated generally at 27. These depressions are arranged so that the edge of the body paneling forming the opening 14 can be bent to seat therein and the depressions are arranged substantially in longitudinal alignment at each side of the bows to conform to receive the side edge portions of the paneling. The filler strips 20 are cut away the length of the depressions so that they lie below the flanges 26. A portion of the paneling adjacent the edges forming the opening is depressed into U-form providing a pair of vertically extending walls 28 and a base 29. Such base rests upon the horizontally extending flanges 26 of the bows and is secured thereto by spot welding, as indicated at 50.

This depressed portion of the panel is coextensive with the edges forming the opening and serves as a seat for the tacking stripping 27. This stripping consists of a sheet metal channel having side walls 30 and an unperforated base 31. Within the tacking stripping is a filler 32, formed preferably of compressed paper, which is formed with spaced vertically extending openings 33 in order that a spot welding machine can be extended therein to weld the base 31 of the tacking stripping to the base 29 of the panel, as indicated at 51. Through attaching the tacking stripping in this manner, rivets and bolts are not required as fastening means and consequently there is no necessity for openings through the base of the tacking stripping for the reception of such fastening means and, as a consequence, there are no openings in the base of the tacking stripping through which there can be leakage. In addition, this manner of securing the tacking stripping adds rigidity to the top frame structure of the body and eliminates the weight of the previously used securing means in the form of rivets and bolts.

A sheet of wadding 34 is placed on top of the antenna and is secured to the neck portions 21 of the fillers 20 in the bows by means of tacks 35. A sheet of decking 36 is placed over the wadding with its edge portions resting on the filler 32 of the tacking stripping, the edge portions being secured thereto by tacks, as indicated at 37. A moulding 38 having an exteriorly extending filler 39 is secured over the edge portion of the decking by means of tacks 40 and closes the space above the tacking stripping.

The roof structure herein described is light in weight as compared to previous roof structures employing composite bows, it is strong and rugged and can be manufactured and assembled at a relatively low cost.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In body manufacture, the method of assembling a tacking stripping to its support consisting of first assembling the filler within the stripping leaving the base of the stripping exposed at intervals of its length and then securing the stripping to the support by welding at the exposed points.

2. In body manufacture, the method of assembling a tacking filler, tacking stripping and support consisting of first assembling the filler in the stripping with openings through the filler leaving spaced points of the stripping exposed and then securing the stripping to the support by welding at said points.

ERWIN L. BARE.